(12) United States Patent
Penz

(10) Patent No.: US 7,328,764 B2
(45) Date of Patent: Feb. 12, 2008

(54) HEAT EXCHANGER PLENUMS FOR GO-KARTS

(76) Inventor: Frederik D. Penz, 2395 Highway 330, Bogart, GA (US) 30622

( * ) Notice: Subject to any disclaimer, the term of this patent is extended or adjusted under 35 U.S.C. 154(b) by 163 days.

(21) Appl. No.: 11/266,561

(22) Filed: Nov. 3, 2005

(65) Prior Publication Data

US 2006/0048985 A1 Mar. 9, 2006

Related U.S. Application Data

(62) Division of application No. 10/656,979, filed on Sep. 5, 2003, now abandoned.

(51) Int. Cl.
*B60K 11/04* (2006.01)
(52) U.S. Cl. ............... 180/68.6; 180/68.4; 180/68.1
(58) Field of Classification Search ............ 180/68.4, 180/68.6, 68.1, 68.2
See application file for complete search history.

(56) References Cited

U.S. PATENT DOCUMENTS

| | | | | |
|---|---|---|---|---|
| 4,249,626 A | * | 2/1981 | Fields et al. ............... | 180/68.1 |
| 4,570,740 A | * | 2/1986 | Hara .......................... | 180/229 |
| 4,618,020 A | * | 10/1986 | Noda et al. ................. | 180/229 |
| 4,633,965 A | * | 1/1987 | Tsurumi et al. ............. | 180/229 |
| 4,662,470 A | * | 5/1987 | Fujisawa et al. ........... | 180/219 |
| 4,685,530 A | * | 8/1987 | Hara ........................... | 180/219 |
| 4,687,069 A | * | 8/1987 | Inomata et al. ............. | 180/68.2 |
| 4,828,017 A | * | 5/1989 | Watanabe et al. .......... | 165/41 |
| 5,715,904 A | * | 2/1998 | Takahashi et al. .......... | 180/229 |
| 6,170,596 B1 | * | 1/2001 | Triarsi et al. ............... | 180/291 |
| 6,648,087 B2 | * | 11/2003 | Kanai ......................... | 180/68.4 |
| 7,000,727 B2 | * | 2/2006 | Korenjak et al. ........... | 180/292 |
| 7,077,228 B1 | * | 7/2006 | White ......................... | 180/219 |
| 7,080,704 B1 | * | 7/2006 | Kerner et al. ............... | 180/68.1 |
| 7,140,329 B2 | * | 11/2006 | Ohzono et al. ............. | 123/41.1 |
| 7,198,322 B2 | * | 4/2007 | Savo .......................... | 296/180.5 |
| 7,216,733 B2 | * | 5/2007 | Iwami et al. ............... | 180/68.1 |
| 2004/0188156 A1 | * | 9/2004 | Karube et al. .............. | 180/68.4 |
| 2005/0217909 A1 | * | 10/2005 | Guay et al. ................. | 180/68.4 |

\* cited by examiner

*Primary Examiner*—Jeff Restifo
(74) *Attorney, Agent, or Firm*—Withers & Keys, LLC

(57) ABSTRACT

Heat exchanger systems for go-karts include a heat exchanger and a plenum that channels air to the heat exchanger to increase cooling efficiency while reducing drag. The plenum has an intake with an area less than a cross-sectional area of a portion of the plenum where the heat exchanger is located to allow velocity air pressure to decrease while increasing static air pressure. The plenum and heat exchanger may be located at various sites on the go-kart including in front of the driver position, beside the driver position, and behind the driver position. Additionally, a centrifugal fan may be included in the plenum to increase the velocity air pressure to overcome internal losses. Also, a plenum body portion may be included on the rear side of the heat exchanger to channel air away from the heat exchanger.

13 Claims, 9 Drawing Sheets

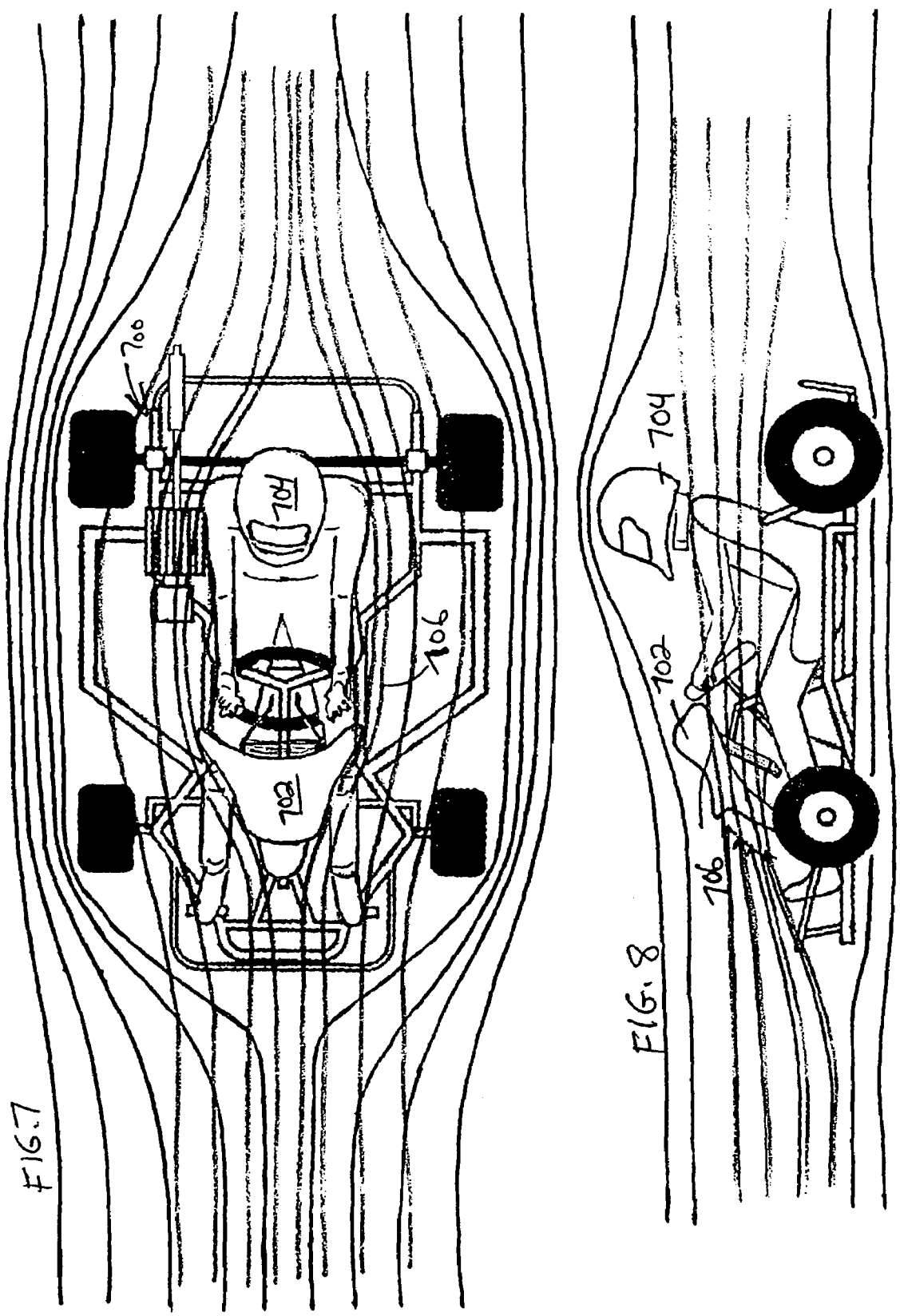

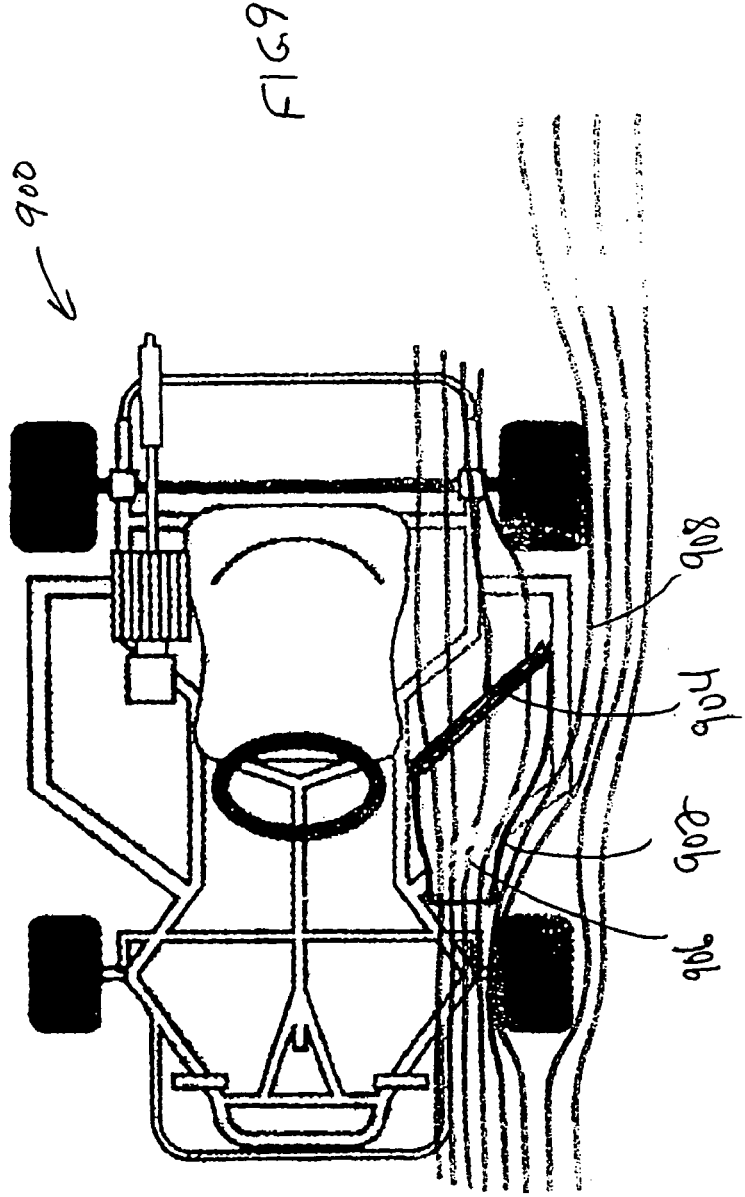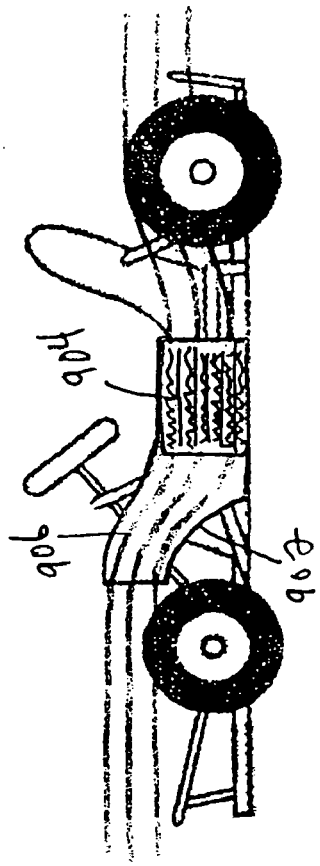

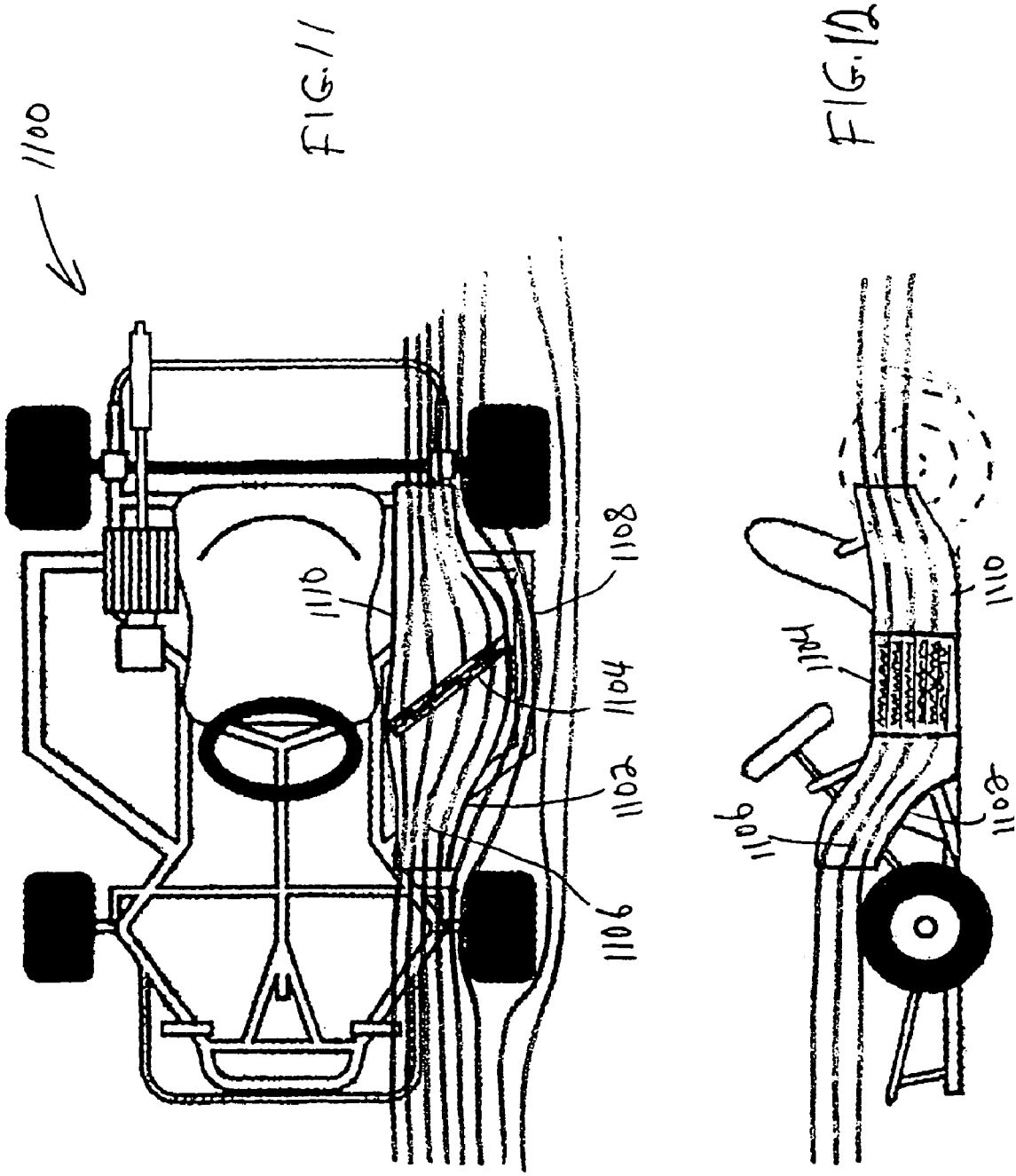

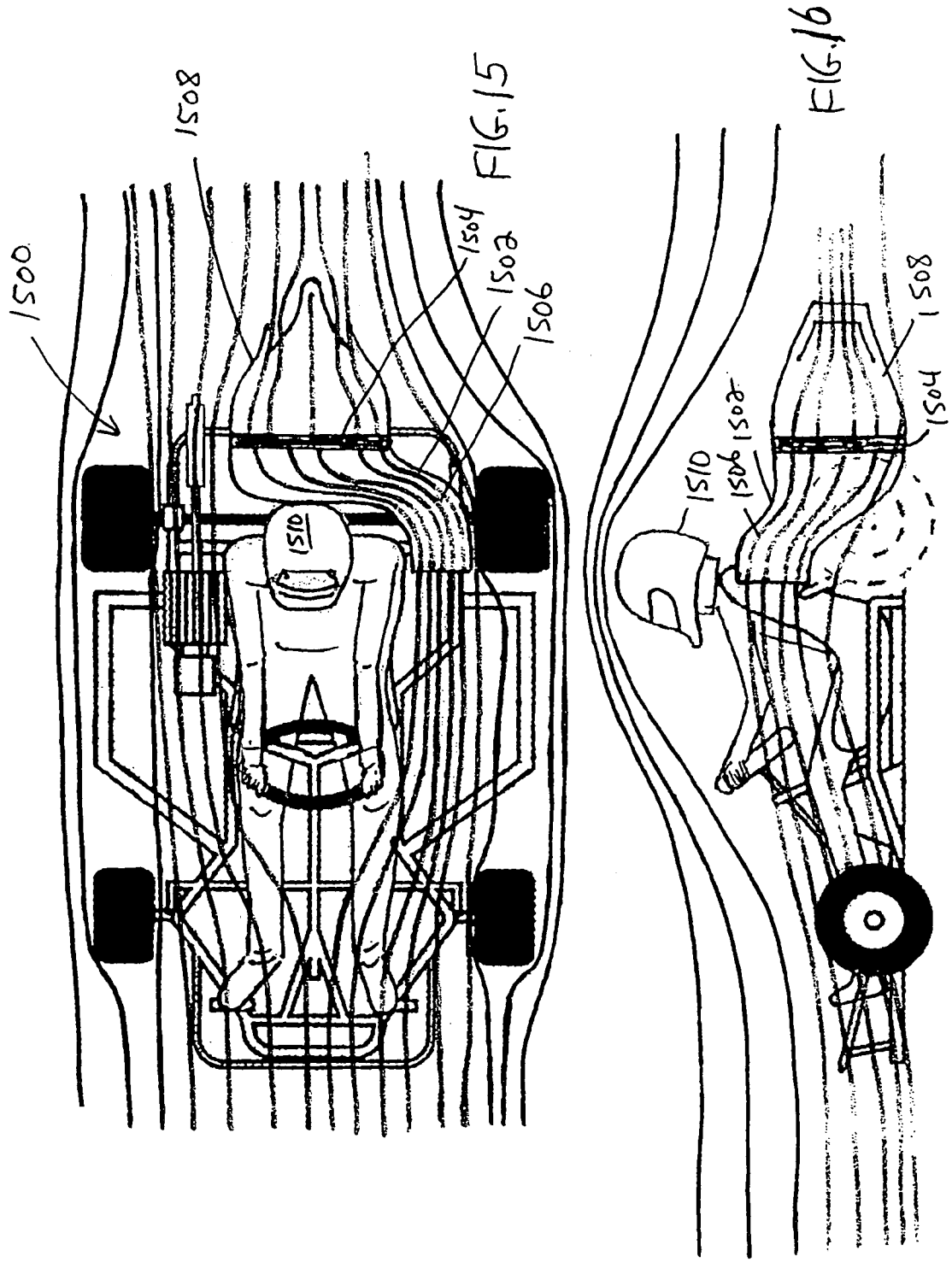

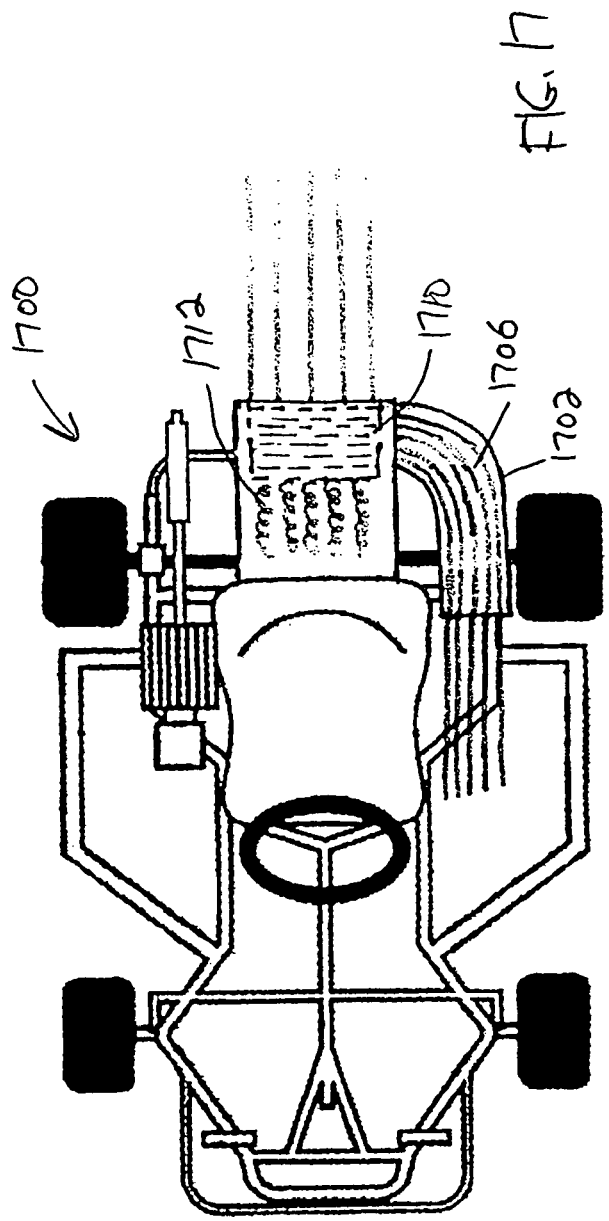
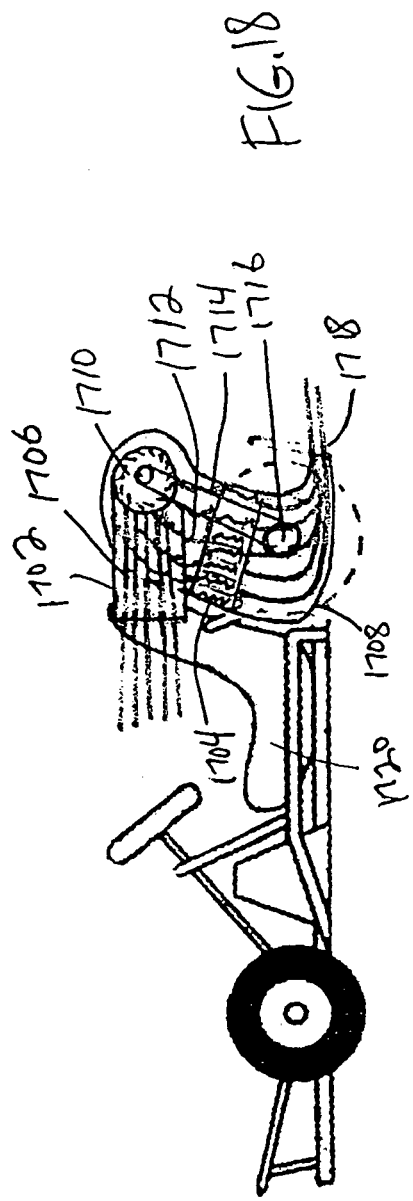
FIG. 17
FIG. 18

HEAT EXCHANGER PLENUMS FOR GO-KARTS

RELATED CASES

The present application is a divisional of U.S. application Ser. No. 10/656,979, entitled, HEAT EXCHANGER PLENUM FOR GO-KARTS and filed on Sep. 5, 2003 now abandoned.

TECHNICAL FIELD

The present invention is related to heat exchangers for go-karts with liquid cooled engines. More particularly, the present invention is related to plenums that work in conjunction with the heat exchangers of the go-karts.

BACKGROUND

Go-karts are a popular form of recreation and competition. Go-karts are those vehicles having four wheels, a frame, and an open cockpit but lack a suspension system. While go-karts started with air-cooled engines, high-performance go-karts have progressed to liquid-cooled engines that utilize a liquid-to-air heat exchanger to remove the heat from the liquid. This liquid cooled configuration allows the engines to achieve a higher performance without overheating.

The heat exchangers, such as a radiator, receive airflow as the go-kart travels, and the heat of the liquid is transferred through the heat exchanger to the flowing air. Typically, go-karts have a side-mounted heat exchanger that is exposed to the surroundings as go-karts are usually limited in size, and the side mount is a convenient place to position the heat exchanger. Thus, air is directed at and around the side-mounted heat exchanger to provide the cooling. However, this conventional side-mounted heat exchanger is an aerodynamically inefficient design.

The aerodynamic inefficiency of this side-mounted heat exchanger occurs because the heat exchanger creates drag by providing resistance to the air passing by the go-kart. Additionally, the side-mounted and exposed position of the radiator provides only a limited amount of air pressure on the front surface of the radiator. Thus, the heat exchanger must not be dense so that air with only limited pressure can be satisfactorily forced through, but must be relatively large to achieve the necessary amount of cooling due to the lack of density. The relatively large size of the heat exchanger results in an overly large amount of drag. This drag created by the heat exchanger negatively impacts the performance, namely acceleration and top speed of the go-kart and therefore, is an undesirable result.

Attempts have been made to improve upon the side-mounted heat exchanger. For example, heat exchangers have been mounted on the rear of the go-kart. However, a rear-mounted heat exchanger also generates an unacceptable amount of drag. This unacceptable amount of drag occurs both because of the blunt, non-aerodynamic shape created by the heat exchanger at the rear of the go-kart and also because the heat exchanger must be relatively large with a low density to account for the lack of air pressure developed on the front side of the heat exchanger.

Attempts have also been made to increase the cooling efficiency of the rear-mounted heat exchanger. A plenum has been placed on the front-side of the rear-mounted heat exchanger to channel air since the rear-mounted heat exchanger is behind the driver seat and does not otherwise receive a freestream of airflow. However, these attempts have failed to properly match the plenum to the heat exchanger to optimize static air pressure on the front of the heat exchanger such that the rear-mounted heat exchanger must continue to be large with a relatively low fin density. Furthermore, these attempts have failed to address the drag associated with the blunt shape at the rear of the go-kart due to the presence of the heat exchanger. Thus, the drag associated with a heat exchanger for a go-kart continues to negatively impact performance.

SUMMARY

Embodiments of the present invention address these issues and others by providing a heat exchanger system for a go-kart that includes a heat exchanger and a plenum body that channels air to the heat exchanger. Utilizing the heat exchanger system allows improved cooling efficiency while decreasing drag. The heat exchanger and plenum body may be placed in various locations on the go-kart. Additionally, an additional plenum body portion may be included to channel air away from the heat exchanger.

One embodiment is heat exchanger system for a go-kart. The heat exchanger system includes a body defining an intake opening on a first end of the body and a portion having a cross-sectional area larger than an area of the intake opening such that the body defines an expansion chamber between the intake opening and the portion. The first end of the plenum body is adapted to face toward the direction of travel of a go-kart. The heat exchanger system also includes a heat exchanger positioned in proximity to the portion of the body such that the body channels air from the intake opening to the heat exchanger. The velocity of air decreases as it approaches the heat exchanger while passing through the expansion chamber thereby decreasing velocity pressure of the air and increasing static pressure of the air. The air pressure at an entry to the heat exchanger resulting from the body is matched to a pressure loss of the heat exchanger by having a cross-sectional area of the portion equal to 4.2 times the area of the intake.

Another embodiment is a heat exchanger system for a go-kart. The heat exchanger system includes a body defining an intake opening on a first end of the body and a portion having a cross-sectional area larger than an area of the intake opening such that the body defines an expansion chamber between the intake opening and the portion. The first end of the plenum body is adapted to face toward the direction of travel of a go-kart. The heat exchanger system also includes a heat exchanger positioned in proximity to the portion of the body and adapted to be positioned in a freestream such that the body channels freestream air from the intake opening to the heat exchanger and wherein the velocity of air decreases as it approaches the heat exchanger while passing through the expansion chamber thereby decreasing velocity pressure of the air and increasing static pressure of the air. The static pressure at an entry to the heat exchanger resulting from the body is greater than a freestream static pressure.

Another embodiment is a go-kart that includes a frame and four wheels coupled directly to the frame such that the four wheels are rigid with the frame but rotate relative to the frame. A liquid-cooled engine mounted to the frame and a drive linkage is located between the engine and at least one of the four wheels. A heat exchanger is in fluid communication with the liquid cooled engine. A plenum body is positioned in proximity to the heat exchanger such that the plenum body channels air to the heat exchanger, and the plenum body defines an intake opening on a first end of the plenum body and defines a portion having a cross-sectional area larger than an area of the intake opening such that the plenum body defines an expansion chamber between the intake opening and the portion. The velocity of air decreases as it approaches the heat exchanger while passing through the expansion chamber thereby decreasing velocity pressure of the air and increasing static pressure of the air. The air pressure at an entry to the heat exchanger resulting from the body is matched to a pressure loss of the heat exchanger by having a ratio of the cross-sectional area of the portion to the area of the intake substantially equal to 4.2.

Another embodiment is a go-kart that includes a frame and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine and is mounted in a freestream position. A plenum body is positioned in proximity to the heat exchanger such that the plenum body channels freestream air to the heat exchanger, and the plenum body defines an intake opening on a first end of the plenum body and defines a portion having a cross-sectional area larger than an area of the intake opening such that the plenum body defines an expansion chamber between the intake opening and the portion. The velocity of air decreases as it approaches the heat exchanger while passing through the expansion chamber thereby decreasing velocity pressure of the air and increasing static pressure of the air. The static pressure at an entry to the heat exchanger resulting from the body is greater than a freestream static pressure.

Another embodiment is a go-kart that includes a frame including a steering wheel support and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine, and the heat exchanger is mounted rigidly with respect to the frame at the steering wheel support. A plenum is positioned in proximity to and on a direction of travel side of the heat exchanger such that the plenum channels air to the heat exchanger. The plenum defines an intake opening on a first side of the plenum body and defines a portion having a cross-sectional area larger than an area of the intake opening such that the plenum body defines an expansion chamber between the intake opening and the portion.

Another embodiment is a go-kart that includes a frame including a side-mounted heat exchanger support and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine, and the heat exchanger is mounted to the frame at the side-mounted heat exchanger support. A plenum body is positioned in proximity to and on the front side of the heat exchanger such that the plenum channels air to the heat exchanger, and the plenum defines an intake opening on a first end of the plenum body and defines a portion having a cross-sectional area larger than an area of the intake opening such that the plenum body defines an expansion chamber between the intake opening and the portion.

Another embodiment is a go-kart that includes a frame including a seat and a heat exchanger support behind the seat and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine, and the heat exchanger is mounted to the frame at the heat exchanger support. A plenum system is positioned in proximity to the heat exchanger and includes a front-side plenum portion that channels air to the heat exchanger and includes a rear-side plenum portion that channels air away from the heat exchanger.

Another embodiment is a go-kart that includes a frame including a seat and a heat exchanger support and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine, and the heat exchanger is mounted to the frame at the heat exchanger support. A plenum system is positioned in proximity to the heat exchanger and includes a plenum that channels air to the heat exchanger. The plenum system further includes a centrifugal fan within the plenum that increases the velocity air pressure of the air channeled to the heat exchanger.

Another embodiment is a heat exchanger system for a go-kart. The heat exchanger system includes a body defining an intake opening on a first end of the body and a portion having a cross-sectional area larger than an area of the intake opening such that the body defines an expansion chamber between the intake opening and the portion. The first end of the plenum body is adapted to face toward the direction of travel of a go-kart. A heat exchanger has a fin density of at least 17 fins per inch and is positioned in proximity to the portion of the body such that the body channels air from the intake opening to the heat exchanger. The velocity of air decreases as it approaches the heat exchanger while passing through the expansion chamber thereby decreasing velocity pressure of the air and increasing static pressure of the air such that airflow is maintained through the heat exchanger.

Another embodiment is a go-kart that includes a frame and four wheels coupled directly to the frame such that the four wheels are rigid with the frame but rotate relative to the frame. A liquid-cooled engine is mounted to the frame, and a drive linkage is located between the engine and at least one of the four wheels. A heat exchanger is in fluid communication with the liquid cooled engine and has a fin density of at least 17 fins per inch. A plenum body is positioned in proximity to the heat exchanger such that the plenum body channels air to the heat exchanger, and the plenum body defines an intake opening on a first end of the plenum body and defines a portion having a cross-sectional area larger than an area of the intake opening such that the plenum body defines an expansion chamber between the intake opening and the portion. The velocity of air decreases as it approaches the heat exchanger while passing through the expansion chamber thereby decreasing velocity pressure of the air and increasing static pressure of the air such that airflow is maintained through fins of the heat exchanger.

DESCRIPTION OF THE DRAWINGS

FIGS. 7 and 8 show the go-kart of FIGS. 5 and 6 in a top view and side view, respectively, including a driver and show airflow around the heat exchanger system and driver maintaining a substantially laminar flow.

FIGS. 9 and 10 show a go-kart in a top view and side view, respectively, having a heat exchanger system including a front-side plenum and heat exchanger mounted to a side-mount and show airflow through and around the heat exchanger system.

FIGS. 11 and 12 show a go-kart in a top view and side view, respectively, having a heat exchanger system including a front side plenum portion, a rear side plenum portion, and a heat exchanger mounted to a side-mount and show airflow through and around the heat exchanger system.

FIGS. 15 and 16 show a go-kart in a top view and side view, respectively, including a driver and having a heat exchanger system including a front side plenum portion, a rear side plenum portion, and a heat exchanger mounted behind the seat and show airflow through the heat exchanger system.

FIGS. 17 and 18 show a go-kart in a top view and side view, respectively, having a heat exchanger system including a front side plenum portion, a centrifugal fan mounted within the front side plenum portion, a rear side plenum portion, and a heat exchanger and show airflow through the heat exchanger system.

DETAILED DESCRIPTION

Embodiments of the present invention provide a heat exchanger system for a go-kart to improve cooling efficiency and reduce drag to thereby increase the performance of the go-kart. As opposed to having a heat exchanger alone, embodiments of the present invention provide a plenum body in conjunction with a heat exchanger. The plenum body channels air to the heat exchanger while providing an aerodynamically efficient shape to also allow airflow to maintain a laminar flow around the heat exchanger.

Figure 1:
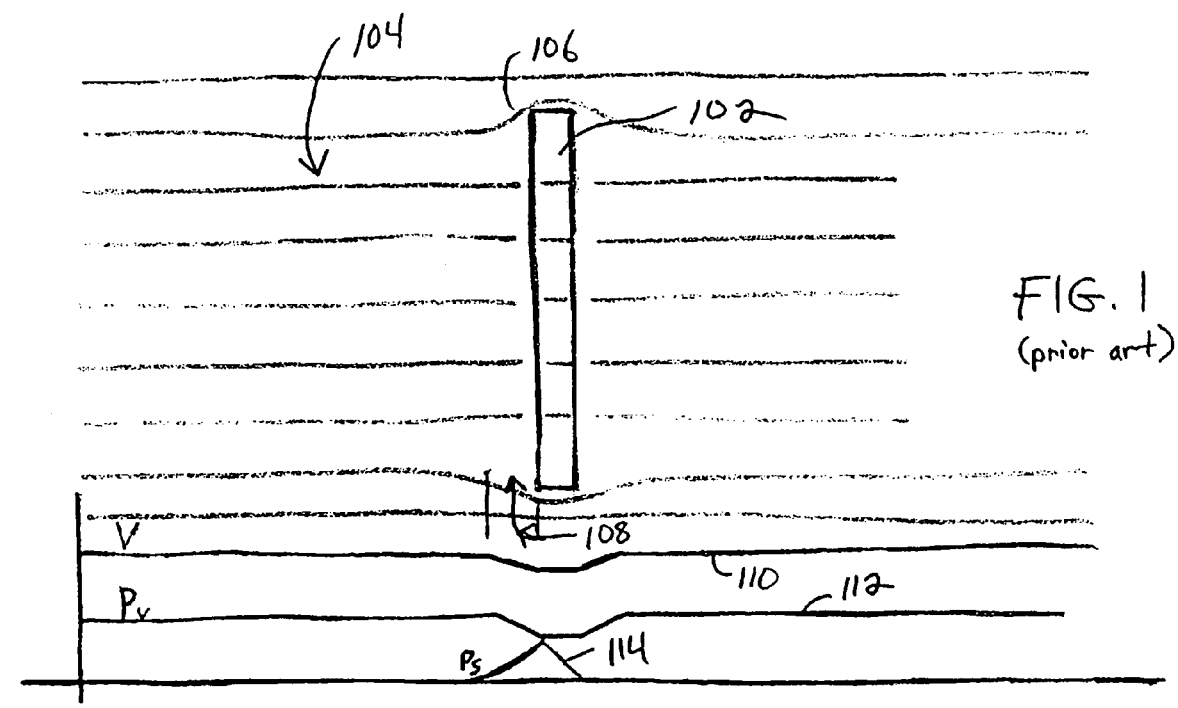
FIG. 1 shows the airflow and related pressures for a heat exchanger for a go-kart without a plenum body.

As shown in FIG. 1, a heat exchanger 102 of a go-kart directly exposed to airflow 104, i.e. a freestream, causes the airflow to pass directly into the heat exchanger 102 while some airflow 106 escapes around the outer edges including the left and right sides and the top and bottom. The airflow 104 that encounters the heat exchanger 102 is restricted by the flow resistance of the heat exchanger 102 resulting in a build-up in static air pressure within the region 108. As the air builds in static pressure, the velocity pressure decreases as the airflow in region 108 slightly decreases.

The curve 110 shows the velocity (V) of the airflow relative to the heat exchanger 102, while the curve 112 shows the velocity pressure and curve 114 shows the static pressure relative to the heat exchanger. As can be seen in curve 110, the airflow velocity begins to slightly decrease within region 108, reaches a minimum as the airflow passes through the heat exchanger 102, and then increases in velocity relative to the heat exchanger 102 after having exited the heat exchanger 102.

The airflow pressure is an important factor in the efficiency of the heat exchanger 102. The airflow pressure is the sum of the velocity pressure ($P_v$) and the static pressure ($P_s$). The change in the static pressure as the air passes through the heat exchanger 102 reflects most directly upon the efficiency of the heat exchanger 102 for relatively low velocity, and this static pressure results from the degree of velocity pressure change as the airflow encounters the heat exchanger 102. The curve 112 demonstrates that the velocity pressure of the air also begins decreasing when the velocity begins decreasing, reaches a minimum as the air reaches the heat exchanger 102, and then increases to steady state upon the airflow exiting the heat exchanger 102. The curve 114 demonstrates that the static pressure is minimal until the airflow begins to encounter the heat exchanger in region 108, and then the static pressure begins increasing, peaking as the air reaches the heat exchanger 102, and then decreases from the peak back to a minimal amount as the air passes through the heat exchanger 102.

While the freestream heat exchanger configuration of FIG. 1 does provide for cooling of the go-kart engine, it can be seen that the change in static pressure through the heat exchanger 102 is a relatively small amount. Thus, the cooling efficiency of this heat exchanger configuration is relatively low. Furthermore, this heat exchanger configuration is a relatively inefficient aerodynamic design as the airflow 106 escapes around the sides and may lead to turbulent flow, possibly reverse flow through the radiator further decreasing cooling efficiency, and also increases the drag of the go-kart. Additionally, for rear-mounted heat exchangers, the heat exchanger is not exposed to a freestream such that little to no static pressure builds on the front side of the heat exchanger.

Figure 2:
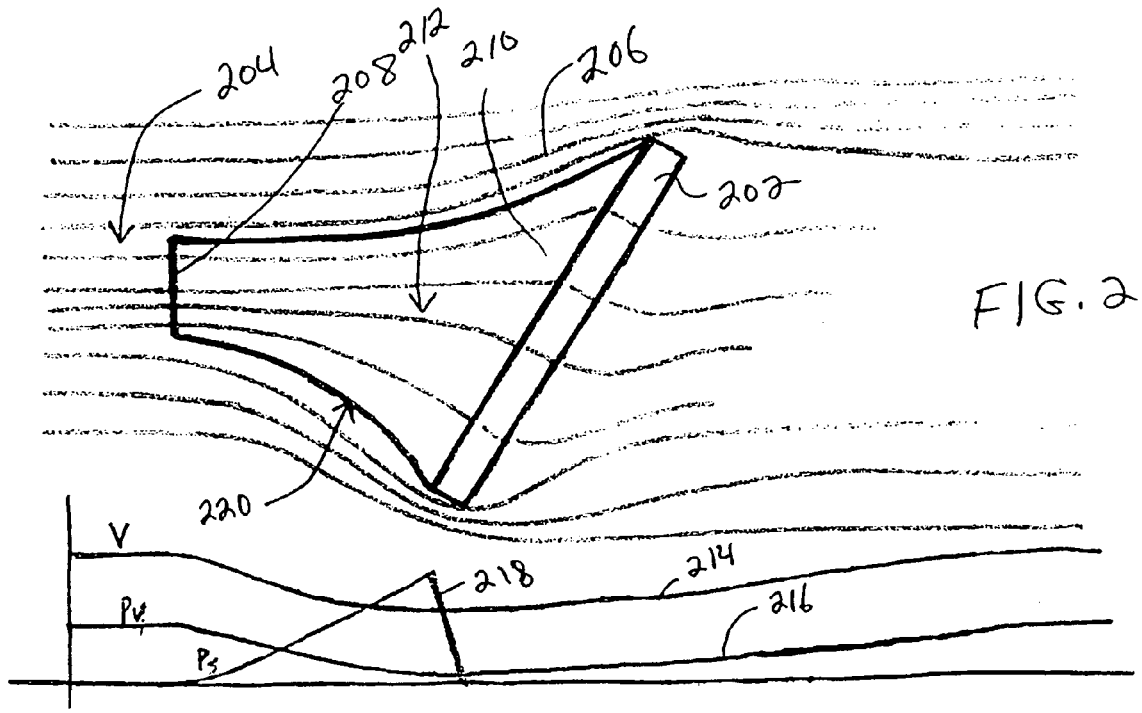
FIG. 2 shows the airflow and related pressures for a heat exchanger system for a go-kart that includes a plenum body.

FIG. 2 shows a heat exchanger system that includes a plenum 220 in conjunction with a heat exchanger 202. A plenum is a body or chamber that exists at a different pressure than the external surroundings. In this application, the plenum provides for a different air pressure at the heat exchanger than is present outside of the plenum. The airflow 204 approaches the heat exchanger system and some of the airflow enters the plenum 220 at an intake opening 208 on a first end of the plenum 220.

As the airflow passes through the plenum toward the heat exchanger, the airflow passes through an expansion chamber 212 created by the cross-sectional area of the plenum 220 increasing as the airflow moves from the intake opening 208 to a portion of the plenum 220 where the heat exchanger 202 is located. The increase in cross-sectional area through the expansion chamber 212 results in a greater volume to be filled by the airflow which results in a slowing of the airflow as it proceeds through the expansion chamber 212 toward the heat exchanger 202.

The velocity and pressure curves demonstrate the effect the plenum 220 has to increase the cooling efficiency of the heat exchanger 202. Curve 214 demonstrates that the velocity (V) of the airflow begins to decrease significantly as the airflow proceeds through the expansion chamber 212, reaches its minimum upon encountering the heat exchanger 202, and begins to increase as the airflow exits the heat exchanger 202. Curve 216 demonstrates that the velocity pressure ($P_v$) begins to decrease with the velocity of the airflow as the airflow proceeds through the expansion chamber 212, reaches its minimum as the airflow encounters the heat exchanger 202, and then increases as the airflow exits the heat exchanger 202 and rejoins the freestream. Curve 218 demonstrates that the static pressure ($P_s$) substantially increases as the airflow passes through the expansion chamber 212, reaches its maximum as the airflow encounters the heat exchanger 202, and rapidly decreases back to a minimal amount as the airflow passes through the heat exchanger 202.

The expansion chamber 212 allows the airflow to decrease in velocity much more than the velocity decreased for the freestream configuration. While the velocity pressure is reduced much more as well, this allows the static pressure to increase to a much higher amount than is achieved in the freestream configuration. This higher static pressure results in higher cooling efficiency through the heat exchanger 202.

It has been determined that the ratio of the intake area to the cross-sectional area of the portion of the plenum where the heat exchanger is located is a relevant factor to properly build the static pressure on the front side of the heat exchanger. It has been found that an optimized ratio of cross-sectional area of the portion at the heat exchanger to the area of the opening is approximately 4.2. It has also been found that a deviation of +/−20% of the area of the intake and/or of the cross-sectional area of the portion at the heat exchanger achieves an acceptable degree of cooling efficiency improvement over a freestream configuration so long as the ratio remains +/−20% of 4.2, and works especially well when applied in conjunction with the heat exchanger values discussed below. Table 1 below provides a range of these operating parameters for one example of a heat exchanger system.

It has also been determined that the fin density of the heat exchanger is a relevant factor. It has been found that an increased fin density for the heat exchanger is desirable to increase cooling efficiency for a heat exchanger of a given area, and the fin density may be increased to reduce the size of the heat exchanger when used in combination with a plenum. As with the ratio of the areas discussed above, a deviation of +/−20% of the fin density of the heat exchanger has been found to achieve an acceptable degree of cooling efficiency improvement over a freestream configuration when applied in conjunction with the plenum ratio discussed above. It has been found that a fin density of 17 fins per inch or greater provide for enhanced cooling efficiency when used in conjunction with a properly proportioned plenum.

Table 1 below also provides a range of this operating parameter as well as an illustrative range for core thickness for examples of a heat exchanger system. It will be appreciated that these ranges are provided as examples only and are not intended to be limiting and that many other parameters may be manipulated to adjust heat exchanger performance. Such parameters include tube spacing and orientation, fin orientation, louver pitch, and the materials used.

TABLE 1

|  | optimized dimension | +20% | −20% |
| --- | --- | --- | --- |
| intake area | 15 (in²) | 18 | 12 |
| heat exchanger portion cross-sectional area | 63 (in²) | 75.6 | 50.4 |
| ratio of portion to intake | 4.2 | 5 | 3.4 |
| fin density | 21 (fin/in) | 25.2 | 16.8 |
| core thickness | 1.5 (in) | 1.8 | 1.2 |

The plenum and heat exchanger may be constructed from one of several different materials. Plastic, fiberglass, carbon composites, and Kevlar have been found to be suitable materials for the plenum body. It has been found that a bare duct plenum may be used to achieve an acceptable improvement in cooling efficiency. However, a plenum having vanes (i.e., rib-like formations) extending between the intake opening and the portion at the heat exchanger may also be used to further limit flow separation and frictional losses within the plenum body. Aluminum and copper have been found to be suitable materials for the heat exchanger to achieve adequate heat transfer from the cooling liquid passing through the heat exchanger core to the airflow passing through the heat exchanger.

Figures 3, 4:
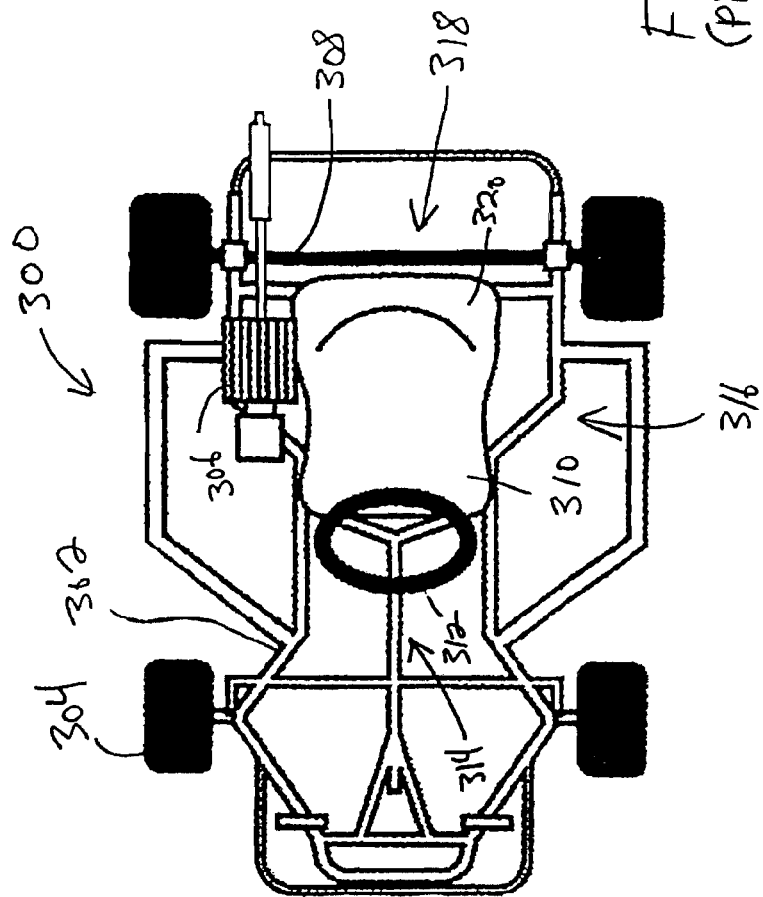
FIGS. 3 and 4 show a standard go-kart in a top view and side view, respectively, to illustrate the various locations where a heat exchanger system may be located.

FIGS. 3 and 4 show typical go-kart 300 having four wheels 304 rigidly attached to a frame 302 rather than being suspended from the frame 302. The go-kart includes a liquid-cooled engine 306 and includes a drive linkage 308 that includes an axle between the rear wheels that is linked to the engine 306 by a chain, belt, or drive shaft. The go-kart includes a seat 310 for the driver and includes a steering wheel 312 and steering wheel support 322. The steering wheel 312 is linked to the front wheels through a steering mechanism including a steering wheel shaft in combination with tie rods and spindles so that the front wheels can turn with turning of the steering wheel 312 to change the direction of travel of the go-kart.

The go-kart 300 has several locations where a heat exchanger system may be located. The heat exchanger system may be placed in front of the driver at a front area 314 and be mounted to the steering wheel support 322. The heat exchanger system may alternatively be placed to one side or the other of the driver, such as at side area 316, and be mounted to the frame 302. The heat exchanger system may also be placed behind the driver at a rear area 318. The various heat exchanger systems and mounting locations are discussed below with reference to FIGS. 5-18.

Figure 5:
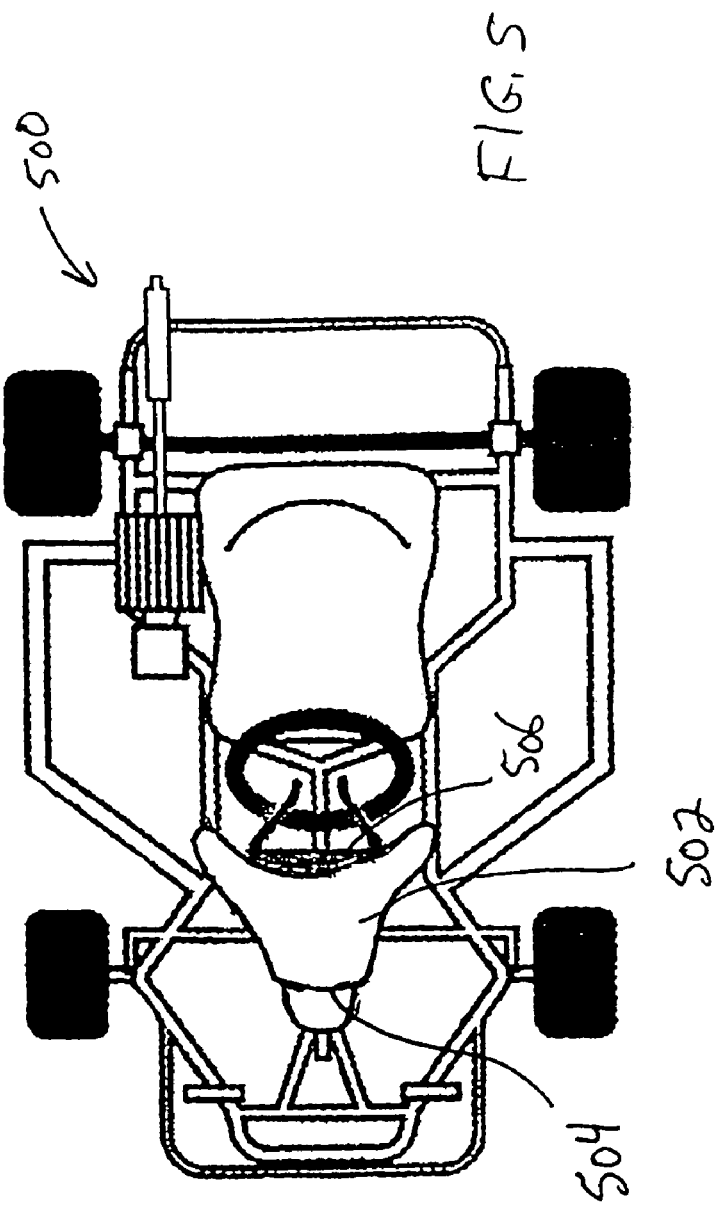
FIGS. 5 and 6 show a go-kart in a top view and side view, respectively, having a heat exchanger system including a front-side plenum and heat exchanger mounted to a steering wheel support of the go-kart.
Figure 6:
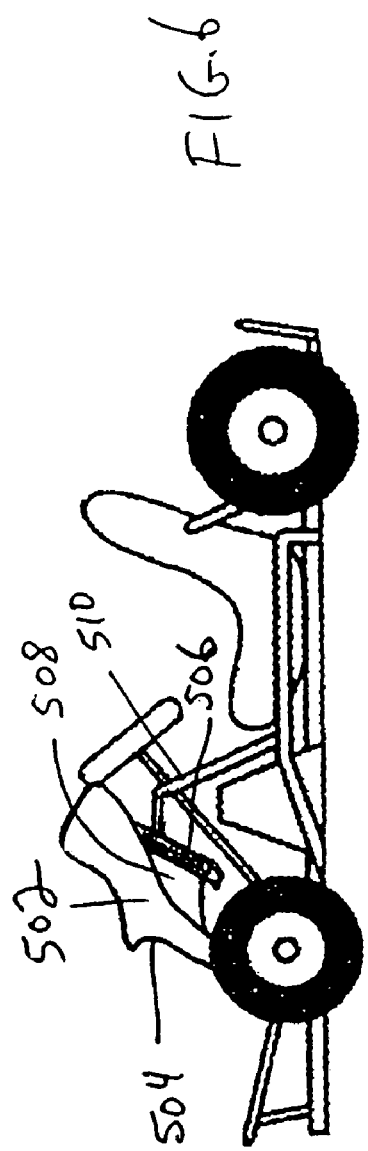

FIGS. 5 and 6 show a go-kart 500 with a heat exchanger system mounted in front of the driver position. The heat exchanger system includes a plenum body 502 and heat exchanger 506. The plenum body 502 has an opening 504 facing the direction of travel of the go-kart for receiving the airflow, and the airflow exits from the heat exchanger system out the rear side of the heat exchanger 506. The expansion chamber 508 of the plenum is located between the front opening 504 and the heat exchanger 506. The heat exchanger system is mounted to the steering wheel support 510.

FIGS. 7 and 8 show a go-kart 700 with the heat exchanger system of FIGS. 5 and 7 but the go-kart 700 is shown in motion with airflow 706 and includes a driver 704. The driver 704 and the plenum 702 form an aerodynamic shape that allows the airflow 706 to maintain a substantially laminar flow around the shape. As shown, the airflow that does not enter the plenum is channeled around and over the plenum 702 and driver 704 to maintain the laminar flow and reduce the drag otherwise produced by a freestream configuration.

FIGS. 9 and 10 show a go-kart 900 with a heat exchanger system mounted to a side of the driver position. A plenum 902 channels airflow 906 to a heat exchanger 904. The airflow 706 exits from the rear of the heat exchanger 904. Airflow 908 that does not enter the plenum 902 maintains laminar flow as it passes around the plenum 908 and beyond the go-kart 900.

FIGS. 11 and 12 show a go-kart 1100 with a heat exchanger system mounted to a side of the driver position that includes both a front side plenum portion 1102 and a rear side plenum portion 1110. The front side plenum portion 1102 directs airflow 1106 to the heat exchanger 1104 while the rear side plenum portion 1110 directs airflow 1106 away from the heat exchanger 1104 after the airflow 1106 has passed through the heat exchanger 1104. The airflow 1108 that does not enter the front side plenum portion 1102 maintains laminar flow as it passes around the front side plenum 1102 and also around the rear side plenum 1108. The rear side plenum 1108 further assures that the airflow 1108 maintains laminar flow upon passing the front side plenum portion and also eliminates any turbulent flow leading to the possibility of reverse flow through the heat exchanger 1104.

Additionally, the rear side plenum portion provides the inverse effect of increasing the velocity of the airflow 1106 once it has exited the heat exchanger 1104 to further assure that the static pressure remains minimal on the rear side of the heat exchanger 1104, thereby further enhancing the cooling efficiency. The rear side plenum has a portion at the heat exchanger 1104 that has a greater cross-sectional area than an area of the exit opening such that the velocity of the airflow returns to its maximum value upon reaching the exit opening.

Figure 13:
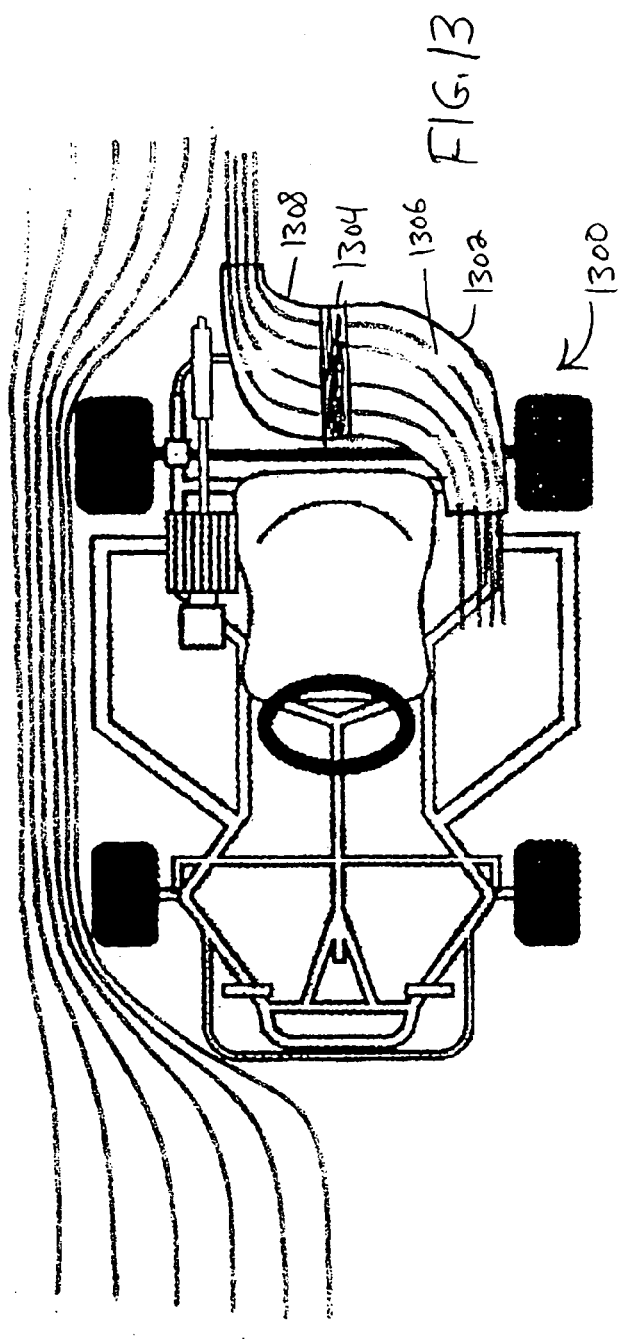
FIGS. 13 and 14 show a go-kart in a top view and side view, respectively, having a heat exchanger system including a front side plenum portion, a rear side plenum portion, and a heat exchanger mounted behind the seat and show airflow through the heat exchanger system.
Figure 14:
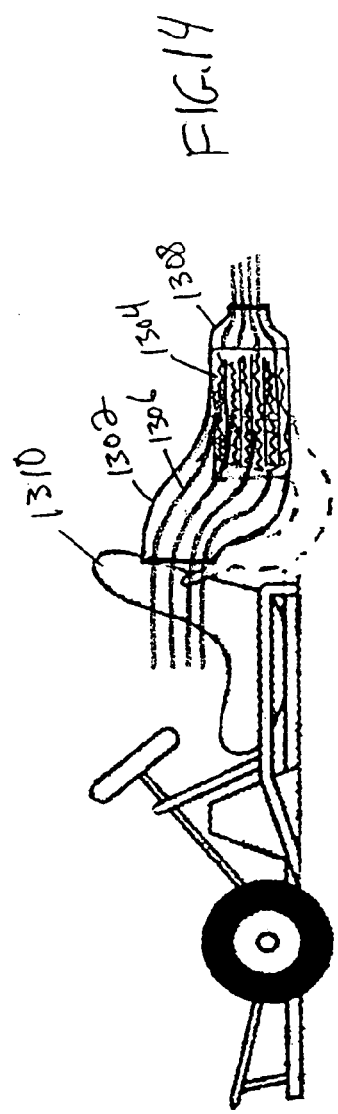

FIGS. 13 and 14 show a go-kart 1300 with a heat exchanger system mounted behind the driver position that includes both a front side plenum portion 1302 and a rear side plenum portion 1308. The front side plenum portion 1302 has an intake to the side of or above the seat 1310 and directs airflow 1306 to the heat exchanger 1304 while the rear side plenum portion 1308 directs airflow 1306 away from the heat exchanger 1304 after the airflow 1306 has passed through the heat exchanger 1304.

The rear side plenum portion of this heat exchanger system configuration also provides the inverse effect of increasing the velocity of the airflow 1306 once it has exited the heat exchanger 1304 to further assure that the static pressure remains minimal on the rear side of the heat exchanger 1304, thereby further enhancing the cooling efficiency. The rear side plenum 1308 has a portion at the heat exchanger 1304 that has a greater cross-sectional area than an area of the exit opening such that the velocity of the airflow returns to its maximum value upon reaching the exit opening.

FIGS. 15 and 16 show a go-kart 1500 with a similar heat exchanger system to that of FIGS. 13 and 14 except that the orientation of the heat exchanger is altered by about 90 degrees, and the go-kart 1500 is shown in motion with airflow 1506 entering the plenum and includes a driver 1510. The driver 1510 together with the front side plenum portion 1502 on the front side of a heat exchanger 1504 and rear side plenum portion 1508 on the rear side of the heat exchanger 1504 form an aerodynamic shape that allows the airflow to maintain a substantially laminar flow around the shape. As shown, the airflow that does not enter the plenum is channeled around and over the driver 1510, front side plenum portion 1502, and rear side plenum portion 1508 to maintain the laminar flow and reduce the drag otherwise produced by a freestream configuration.

FIGS. 17 and 18 show a go-kart 1700 with a heat exchanger system mounted behind the driver position that includes both a front side plenum portion 1702 and a rear side plenum portion 1708. The front side plenum portion 1702 has an intake to the side of or above the seat 1720 and directs airflow 1706 to the heat exchanger 1704 while the rear side plenum portion 1708 directs airflow 1706 away from the heat exchanger 1704 after the airflow 1706 has passed through the heat exchanger 1704.

In this example, a centrifugal fan 1710 is located within the front side plenum portion 1702. As shown, the centrifugal fan 1710 is driven by a chain or belt 1714 linked to the drive axle 1716. The centrifugal fan 1710 creates turbulent airflow 1712 with an increased velocity relative to the airflow 1706 entering the front side plenum portion 1702 to overcome frictional losses of the intake opening of the front side plenum portion 1702 so as to maintain a high airflow velocity and increase velocity pressure. As the increased velocity pressure experiences a greater pressure drop when approaching the heat exchanger 1704, the static pressure builds to a higher peak pressure before being dissipated entirely as the airflow 1706 proceeds through the heat exchanger 1704.

In addition to driving the centrifugal fan 1710 from a part of the drive linkage between the engine and the drive wheel(s), the centrifugal fan 1710 may be powered in other manners as well. For example, an electrical motor may be included to drive the centrifugal fan 1710. The electrical motor may be battery-powered or may be powered from an electrical generator being powered by the engine of the go-kart.

The rear side plenum portion may also be included to provide the inverse effect of increasing the velocity as the airflow 1706 exits and proceeds away from the heat exchanger 1704. In the example shown, the airflow exits the rear side heat exchanger at the rear-underside location 1718 of the go-kart frame such that the airflow passing underneath the go-kart assists in creating a low pressure that draws the airflow from the plenum to further increase the exit velocity.

While the centrifugal fan has been shown and described in relation to a rear mounted heat exchanger system that includes both a front side plenum portion 1702 and a rear side plenum portion 1708, it will be appreciated that the centrifugal fan may be included between the intake opening and the portion of the plenum where the heat exchanger is located in any of the various mounting positions described herein. Use of an electrical motor to drive the fan allows placement of the fan in locations where drive from the drive linkage is not possible. Furthermore, it will be appreciated that the centrifugal fan may be included in heat exchanger systems that include a plenum body only on the front side of the heat exchanger as well as heat exchanger systems including a front side plenum portion and a rear side plenum portion.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A go-kart, comprising:
   a frame;
   four wheels coupled directly to the frame such that the four wheels are rigid with the frame but rotate relative to the frame, the coupling of the four wheels defining a horizontal geometric plane;
   a liquid-cooled engine mounted to the frame;
   a drive linkage between the engine and at least one of the four wheels;
   a forward facing seat that is exposed to the ambient and that has a bottom portion and a back portion that extends away from the bottom portion, the bottom portion having a top surface defining a second geometric plane and the back portion having a front surface defining a third geometric plane with a smaller angle between the second geometric plane and the horizontal geometric plane than an angle between the third geometric plane and the horizontal geometric plane, and the bottom portion being mounted to the frame;
   a heat exchanger in fluid communication with the liquid cooled engine and positioned in front of the forward facing seat such that a fourth geometric plane that is parallel to the horizontal geometric plane extends through a vertically measured center of the heat exchanger and also extends through the back portion of the forward facing seat; and
   a plenum body that is exposed to the ambient and that is positioned in proximity to the heat exchanger such that the plenum body channels air to the heat exchanger, the plenum body defining an intake opening on a first end of the plenum body and defining a portion having a cross-sectional area larger than an area of the intake opening such that the plenum body defines an expansion chamber between the intake opening and the portion.

2. The go-kart of claim 1, wherein the air pressure at an entry to the heat exchanger resulting from the plenum body is matched to a pressure loss of the heat exchanger by having a ratio of the cross-sectional area of the portion to the area of the intake substantially equal to 4.2.

3. The go-kart of claim 1, wherein the frame includes a steering wheel support and wherein the heat exchanger is mounted to the steering wheel support.

4. The go-kart of claim 1, wherein when in forward motion, the plenum body creates airflow characteristics that comprise accelerated and substantially laminar airflow over and around the plenum body and continuing substantially laminar airflow over and around the back portion of the forward facing seat.

5. A go-kart, comprising:
a frame;
four wheels coupled directly to the frame such that the four wheels are rigid with the frame but rotate relative to the frame, the coupling of the four wheels defining a horizontal geometric plane;
a liquid-cooled engine mounted to the frame;
a drive linkage between the engine and at least one of the four wheels;
a forward facing seat that is exposed to the ambient and that has a bottom portion and a back portion that extends away from the bottom portion, the bottom portion having a top surface defining a second geometric plane and the back portion having a front surface defining a third geometric plane with a smaller angle between the second geometric plane and the horizontal geometric plane than an angle between the third geometric plane and the horizontal geometric plane, and the bottom portion being mounted to the frame;
a heat exchanger in fluid communication with the liquid cooled engine and being positioned in a freestream location in front of the forward facing seat; and
a plenum body positioned in proximity to the heat exchanger such that the plenum body channels freestream air to the heat exchanger, the plenum body defining an intake opening on a first end of the plenum body and defining a portion having a cross-sectional area larger than an area of the intake opening such that the plenum body defines an expansion chamber between the intake opening and the portion creates airflow characteristics that comprise accelerated and substantially laminar airflow over and around the plenum body and continuing substantially laminar airflow over and around the the back portion of the forward facing seat.

6. The go-kart of claim 5, wherein the air pressure at an entry to the heat exchanger resulting from the plenum body is matched to a pressure loss of the heat exchanger by having a ratio of the cross-sectional area of the portion to the area of the intake substantially equal to 4.2.

7. The go-kart of claim 5, wherein the frame includes a steering wheel support and wherein the heat exchanger is mounted to the steering wheel support.

8. A go-kart, comprising:
a frame;
four wheels coupled directly to the frame such that the four wheels are rigid with the frame but rotate relative to the frame, the coupling of the four wheels defining a horizontal geometric plane;
a liquid-cooled engine mounted to the frame;
a drive linkage between the engine and at least one of the four wheels;
a forward facing seat that has a bottom portion and a back portion that extends away from the bottom portion, the bottom portion having a top surface defining a second geometric plane and the back portion having a front surface defining a third geometric plane with a smaller angle between the second geometric plane and the horizontal geometric plane than an angle between the third geometric plane and the horizontal geometric plane, and the bottom portion being mounted to the frame and the forward facing seat being exposed to an ambient such that a fourth geometric plane that is parallel to the horizontal geometric plane extends through a vertically measured center of the liquid-cooled engine and also extends through the back portion of the forward facing seat;
a heat exchanger in fluid communication with the liquid cooled engine, the heat exchanger being mounted rigidly with respect to the frame and in front of the forward facing seat; and
a plenum body that is exposed to the ambient and is positioned in proximity to and on a direction of travel side of the heat exchanger such that the plenum channels air to the heat exchanger, the plenum defining an intake opening on a first side of the plenum body and defining a portion having a cross-sectional area larger than an area of the intake opening such that the plenum body defines an expansion chamber between the intake opening and the portion.

9. The go-kart of claim 8, wherein the plenum body provides a substantially laminar flow of air around the the forward facing seat.

10. The go-kart of claim 8, wherein the air pressure at an entry to the heat exchanger resulting from the plenum body is matched to a pressure loss of the heat exchanger by having a ratio of the cross-sectional area of the portion to the area of the intake substantially equal to 4.2.

11. The go-kart of claim 8, wherein a fifth geometric plane that is parallel to the horizontal geometric plane extends through a vertically measured center of the heat exchanger and also extends through the back portion of the forward facing seat.

12. The go-kart of claim 8, wherein when in forward motion, the plenum body creates airflow characteristics that comprise accelerated and substantially laminar airflow over and around the plenum body and continuing substantially laminar airflow over and around the back portion of the forward facing seat.

13. The go-kart of claim 8, wherein a fifth geometric plane that is parallel to the horizontal geometric plane extends through a vertically measured center of the heat exchanger and also extends through the back portion of the forward facing seat and wherein when in forward motion, the plenum body creates airflow characteristics that comprise accelerated and substantially laminar airflow over and around the plenum body and continuing substantially laminar airflow over and around the back portion of the forward facing seat.

* * * * *